US008000697B1

(12) United States Patent
Duck

(10) Patent No.: US 8,000,697 B1
(45) Date of Patent: Aug. 16, 2011

(54) PARALLEL LOADING OF WIRELESS SWITCH UPDATES

(75) Inventor: Ernest Duck, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 363 days.

(21) Appl. No.: 11/565,957

(22) Filed: Dec. 1, 2006

(51) Int. Cl.
*H04W 24/00* (2009.01)

(52) U.S. Cl. ........ 455/423; 455/424; 455/418; 455/419; 455/420; 455/428; 370/352

(58) Field of Classification Search .................. 455/403, 455/418–420, 423–425; 370/352
See application file for complete search history.

(56) References Cited

U.S. PATENT DOCUMENTS

| | | | | |
|---|---|---|---|---|
| 7,369,538 | B1 * | 5/2008 | Ehlinger et al. | 370/352 |
| 7,463,610 | B2 * | 12/2008 | Collins | 370/338 |
| 2005/0076333 | A1 * | 4/2005 | Leclair et al. | 717/176 |
| 2008/0294418 | A1 * | 11/2008 | Cleary et al. | 703/21 |

OTHER PUBLICATIONS

Bell Labs Technical Journal, vol. 2, issue 1, p. 65-73, winter 1997, "On-Site Data Evolution for a 5ESS Switch Retrofit", J. Casper Kruisbrink, Jaap Bood, and Mary Ann Parsons.*
"Introduction to TMN", CTIT Technical Report 99-09, Apr. 1999, University of Twente, The Netherlands, Aiko Pras, Bert-Jan van Beijnum, Ron Sprenkels.*

* cited by examiner

*Primary Examiner* — Jinsong Hu
*Assistant Examiner* — Qun Shen

(57) ABSTRACT

A mobile telephony switch may comprise several distinct software components, such as a wireless network control component, a data network access component, and a PSTN interface component. Software updates may be prepared and applied to each component individually. In accordance with the present invention software updates may be prepared and/or applied to the software components in parallel.

13 Claims, 7 Drawing Sheets

| 310 | 320 | 330 | 340 | 350 | 360 | 370 | 380 | 390 | 312 |
|---|---|---|---|---|---|---|---|---|---|
| ECP Freeze Periods | TimeLine | Element | Procdure | Task | D/N | R/L/TO | Est. Time | CMC | EVDO Freeze Periods |
| | | | | **3 Weeks Before the Night of Retrofit** | | | | | |
| | 3 Weeks Prior | ECP | Prep | Open all necessary windows and capture sessions | D/N | R | 10 | | |
| | 3 Weeks Prior | EVDO | Prep | Acquainting yourself with the DO-RNC market configuration | D/N | R | 5 | | |
| | 3 Weeks Prior | ECP | Prep | Check out the AP and OMP root level password for /var clean-up | D | L | 5 | | |
| | 3 Weeks Prior | ECP | Prep | Clean-Up of /var on OMP (needs to be around 35% available 65% utilized) | D | L | 20 | | |
| | 3 Weeks Prior | ECP | Prep | Clean-Up of /var on all MM-AP's (needs to be around 45% available 55% utilized) | D | L | 60 | | |
| | 3 Weeks Prior | ECP | Prep | Clean-Up of /var on all GNP-AP's (needs to be around 25% available 75% utilized) | D | L | 60 | | |
| | 3 Weeks Prior | EVDO | Prep | Upgrade EVDO cell sites (including cells in growth) to release 26 (initiate **op:bts, generic** | N | L | 120 | | |
| | 3 Weeks Prior | ECP | 2-2 | Verifying that the Minimium SU (BWM26_003 with CTF-G for ECP and R26_F003) is applie | D | R | 3 | | |
| | 3 Weeks Prior | ECP | Prep | Checking for HIP4 T1/E1 boards on HSL MM-AP's | D | R | 5 | | |
| | 3 Weeks Prior | ECP | 2-1 | Applying and Making Official the Minimum SU (if applicable) | N | L | 30 | | |
| | 3 Weeks Prior | ECP | Prep | Verify that the FMM-AP Avaya Cajun hubs are operating on firmware version 4.1.X | D | R | 5 | | |
| | 3 Weeks Prior | ECP | Prep | Verifying the FMM-AP Intraframe and Interframe Cabling (aplanconfig) | D | R | 30 | | |
| | 3 Weeks Prior | ECP | Prep | Verifing the Code Switch is accessible in each GNP-AP Frame | D | R | 10 | | |
| | 3 Weeks Prior | EVDO | Prep | Verify that the EVDO-AP Avaya Cajun hubs are operating on firmware version 4.1.X | D | R | 5 | | |
| | 3 Weeks Prior | EVDO | Prep | Check JDBC Tunnel Status | D | R | 5 | | |
| | 3 Weeks Prior | EVDO | Prep | Check EVDO Frame Security -R1SR Frame only | D | R | 5 | | |
| | 3 Weeks Prior | EVDO | Prep | Check EVDO secadmin | D | R | 5 | | |
| | 3 Weeks Prior | EVDO | Prep | Check cell software version (All EVDO BTS need to be on R26. Including cells in growth). | D | R | 1 | | |
| | | | | | | | 384 | **6.4** | |
| | | | | **2 Weeks Before the Night of Retrofit** | | | | | |
| | 2 Weeks Prior | ECP/EVDO | Prep | Open all necessary windows and capture sessions | D/N | R | 10 | | |
| | 2 Weeks Prior | EVDO | Prep | Acquainting yourself with the DO-RNC market configuration | D/N | R | 5 | | |
| | 2 Weeks Prior | ECP | 5-1 | Obtaining the Software Release 27.0 OSR Tool | D | R | 0 | | |
| | 2 Weeks Prior | ECP | 5-2 | Verifying that Sufficient Disk Space is Available in the omp-data file system | D | R | 5 | | |
| | 2 Weeks Prior | ECP | 5-3 | Removing Old Versions of the OSR Tool on the OMP | D | R | 2 | | |
| | 2 Weeks Prior | ECP | 5-5 | Removing Old Versions of the 1XRNC OSR Tool on the OMP | D | R | 2 | | |
| | 2 Weeks Prior | ECP | 5-4 | Loading the OSR Tool onto the OMP | D | R | 12 | | |
| | 2 Weeks Prior | ECP | 5-6 | Loading the RNC OSR Tool onto the OMP | D | R | 12 | | |
| | 2 Weeks Prior | EVDO | 2-15 | Loading EVDO OSR and EVDO Precheck sofware on the OMP | D | R | 12 | | |
| | 2 Weeks Prior | ECP | 5-7 | Executing AP Pre-Retrofit check tool | D | R | 120 | | |
| | 2 Weeks Prior | ECP | 5-8 | Checking the secroot on ALL AP's | D | R | 5 | | |
| | 2 Weeks Prior | ECP | 5-9 | Backing Up the ECP Databases | D | L | 15 | | |
| | 2 Weeks Prior | ECP | 5-10 | Transferring the Source Databases to the OMP | D | L | 15 | | |
| | 2 Weeks Prior | ECP | 5-11 | Unloading Data from the Source Release Databases | D | L | 15 | | |
| | 2 Weeks Prior | ECP | 5-12 | Evolving Data from the Source Release to the Target Release Structure | D | L | 1 | | |
| | 2 Weeks Prior | ECP | 5-13 | Mapping Data within the Target Release | D | L | 1 | | |
| | 2 Weeks Prior | ECP | 5-14 | Recovering a Retrofit That Is Blocked Because the Purchased System Capacity Was Excee | D | NA | 0 | | |
| | 2 Weeks Prior | ECP | 5-15 | Recovering a Retrofit That IS Blocked Because the Maximum Daily Call Attempt Arrary Is Co | D | NA | 0 | | |
| | 2 Weeks Prior | ECP | 5-16 | Verifying/Modifying the MSO Target Database Sizes | D | L | 5 | | |
| | 2 Weeks Prior | ECP | 5-17 | Creating the Target Release Databases | D | L | 1 | | |
| | 2 Weeks Prior | ECP | 5-18 | Loading Data into the Target Release Database | D | L | 30 | | |
| | 2 Weeks Prior | ECP | 5-19 | Generating Digit Tables and Other Files | D | L | 1 | | |
| | 2 Weeks Prior | ECP | 5-20 | Writing the Target Release ODD to DAT | D | L | 5 | | |

*FIG. 3A.*

EVDO RNC/AP INTEGRATION HARDWARE FREEZE

ECP HARDWARE FREEZE

| | | | | | | | |
|---|---|---|---|---|---|---|---|
| 2 Weeks Prior | ECP | 5-21 | Sending the Target Release ODA to the ECP | D | L | 5 | |
| 2 Weeks Prior | ECP | 5-22 | Executing the 1XRNC OSR Tool on the OMP | D | L | 30 | |
| 2 Weeks Prior | EVDO | Prep | Validate Software is up to date before commiting | D | R | 5 | |
| 2 Weeks Prior | EVDO | 2-8 | Commit Current Software via SUAGUI | D | R | 5 | |
| 2 Weeks Prior | EVDO | 2-10 | Check cell site software version | D | R | 5 | |
| 2 Weeks Prior | EVDO | Prep | Validate Security configuration on all DO-RNC AP's | D | R | 1 | |
| 2 Weeks Prior | EVDO | 2-16 | Transfer Precheck and OSR software to RNC | D | R | 6 | |
| 2 Weeks Prior | EVDO | 2-18 | Install Precheck software on the first DO-AP, Execute Utility tool to prepare software on all D( | D | R | 10 | |
| 2 Weeks Prior | EVDO | 2-22 | Prepare System | D | R | 5 | |
| 2 Weeks Prior | EVDO | 2-25 | Perform System Prechecks | D | R | 10 | |
| 2 Weeks Prior | EVDO | 2-29 | Run OSR | D | R | 20 | |
| 2 Weeks Prior | EVDO | 2-32 | Troubleshoot OSR | D/N | R/L | 30 | |
| 2 Weeks Prior | EVDO | 2-34 | Troubleshoot the database update | D/N | R/L | 30 | |
| | | | | | | 436 | 7.267 |
| | | | **8 Nights Before the Night of Retrofit** | | | | |
| 8 Days Prior | ECP | 3-1 | Writing the RTR Operating System ECDs to File | N | R | 180 | Y |
| 8 Days Prior | ECP | Prep | Validation remote acess into the ECP EAI MCRT | N | R | 1 | |
| | | | | | | 181 | 3.017 |
| | | | **3 Days Before Night of Retrofit** | | | | |
| Test Ops Supplement | EVDO | Prep | Acquainting yourself with the DO-RNC market configuration | D/N | R | 5 | |
| Test Ops Supplement | ECP | | Validate the status of the ECP OSR Tool. | D | R | 60 | |
| Test Ops Supplement | ECP | 5-22 | Running 1xRNC OSR Tool | D | R | 20 | |
| Test Ops Supplement | ECP | NTAC LED | LED | D | R | 5 | |
| Test Ops Supplement | ECP | NTAC LED | Transferring the OMP Software from LED. Distributing OMP R27 Software | R | R | 45 | |
| Test Ops Supplement | ECP | NTAC LED | Transferring the AP/FMM AP and 1XRNC R27 and COM FileSoftware from LED. | D | R | 60 | |
| Test Ops Supplement | EVDO | NTAC LED | Transfering the EVDO-AP and COM File Sofware from LED. | D | R | 45 | |
| Test Ops Supplement | ECP | 4-10 | Checking the Flexent AP(GNP-AP) Release 27.0 Application Software That Were Downloaded from the LED Server. | D | R | 10 | |
| Test Ops Supplement | ECP | 4-11 | Checking the FMM-AP, COM and 1X RNC Release 27.0 Application Software That Were Downloaded from the LED Server | D | R | 15 | |
| Test Ops Supplement | ECP | 4-14 | Checking the OMP Release 27.0 Application Swoftware That was Downloaded from the LED Server. | D | R | 10 | |
| Test Ops Supplement | ECP | NA | Checking Number of RCS Instances on the GNP-APs | D | R | 5 | |
| 3 Days Prior | ECP | 4-5 | Checking and Distributing the LED Download of the ECP Release 27.0 Retrofit Package (ECD, GEN, and TOP) | D | L | 15 | |
| 3 Days Prior | ECP | 4-6 | Writing the ECP ECD to DAT | D | L | 5 | |
| 3 Days Prior | ECP | 4-7 | Writing the Generic Text Data to DAT | D | L | 15 | |
| 3 Days Prior | ECP | 4-8 | Writing the ECP TOP to DAT | D | L | 1 | |
| 3 Days Prior | ECP | 4-9 | Verifying the ECP Retrofit Package DATs (ECD, GEN(RT0,1,2), and TOP) | D | L | 30 | |
| 3 Days Prior | ECP | 6-1 | Performing the Pre-Retrofit System Check | D | L | 80 | |
| 3 Days Prior | ECP | 6-2 | Backing up the OMP Release 26 application software to DAT | D | L | 5 | |
| 3 Days Prior | ECP | 7-1 | Backing Up the INCORE ECD Databases | N | L | 2 | |
| 3 Days Prior | ECP | 7-2 | Performing an ECP Full System Backup | N | L | 300 | |
| | | | | | | 733 | 12.22 |
| | | | **2 Days Before Night of Retrofit** | | | | |
| 2 Days Prior | ECP/EVDO | Prep | Open all necessary windows and capture sessions | D/N | R | 10 | |
| 2 Days Prior | EVDO | Prep | Acquainting yourself with the DO-RNC market configuration | D/N | R | 5 | |

FIG. 3B.

ECP HARDWARE FREEZE

ECP DATABASE FREEZE

EVDO RNC/AP INTEGRATION HARDWARE FREEZE

EVDO DATABASE/PROVISIONING FREEZE

| | | | | | | | |
|---|---|---|---|---|---|---|---|
| 2 Days Prior | ECP | 6-1 | Performing the Pre-Retrofit System Check | D | R | 80 | |
| 2 Days Prior | ECP | 7-5 | Verifying receipt of the ECP Release 27.0 retrofit DATs | D | TO | | |
| 2 Days Prior | ECP | 4-12 | Preparing the OMP Release 27.0 Supplemental Softwre That was Dowloaded from the LED. | D | R | 10 | |
| 2 Days Prior | ECP | 4-14 | LED Server. | D | R | 10 | |
| 2 Days Prior | ECP | 13-5 | Verifying the OMP is booted off of disk 0 | D | R | 3 | |
| 2 Days Prior | ECP | 7-8 | Upgrading the SUA Package on the OMP | D | R | 5 | |
| 2 Days Prior | EVDO | 3-2 | Determine Frame Type | D/N | R | 1 | |
| 2 Days Prior | EVDO | 3-4 | Check Alarms | D | R | 5 | |
| 2 Days Prior | EVDO | Prep | Check JDBC Tunnel Status | D | R | 5 | |
| 2 Days Prior | EVDO | Prep | Check EVDO Frame Security-R1SR Frame only | D | R | 5 | |
| 2 Days Prior | EVDO | Prep | Check EVDO secadmin | D | R | 5 | |
| 2 Days Prior | EVDO | 3-9 | Refresh SUA shared secret keys for RNC on OMP- R1SR Frame Only | D | R | 15 | |
| 2 Days Prior | EVDO | Prep | Validate 1xEV-DO RNC software is present on OMP | D | R | 1 | |
| 2 Days Prior | EVDO | 3-11 | Prepare new software | D | R | 30 | |
| 2 Days Prior | EVDO | 2-25 | Perform System Prechecks | D | R | 10 | |
| 2 Days Prior | EVDO | 2-29 | Re-Run OSR (Data Freeze Starts) | D | R | 20 | |
| 2 Days Prior | ECP | 7-4 | Auditing the ECP File System | N | R | 20 | Y |
| 2 Days Prior | ECP | 7-9 | Loading the Flexent AP Release 27 Software Package via SUA | N | R | 30 | Y |
| 2 Days Prior | ECP | 7-10 | Installing the Flexent AP release 27 Software Package via SUA | N | R | 60 | Y |
| 2 Days Prior | ECP | 7-11 | Loading the FMM-AP and Optional 1XRNC R26 Sofware Packages via SUA | N | R | 30 | Y |
| 2 Days Prior | ECP | 7-12 | Installing the FMM-AP and Optional 1XRNC R26 Software Packages via SUA | N | R | 180 | Y |
| 2 Days Prior | EVDO | 3-13 | Install the software via SUAGUI | N | R | 120 | Y |
| 2 Days Prior | EVDO | 3-17 | ReRun the OSR Tool | N | R | 20 | Y |
| 2 Days Prior | EVDO | 3-18 | Clear Java Cache for EMS GUI | N | L/R | 5 | Y |
| 2 Days Prior | EVDO | 3-20 | Clear Internet Explorer Browser Cache | N | L/R | 5 | Y |
| | | | | | | 690 | 11.5 |
| | | | **1 Day Before Night of Retrofit** **Note: If the retrofit falls on a Monday Night, this entire proecudure will need to be performed by the nightshift.** | | | | |
| 1 Day Prior | ECP | Prep | Open all necessary windows and capture sessions | D/N | R | 10 | |
| 1 Day Prior | ECP | 8-1 | Collecting the AMA Data | D/N | L | 480 | |
| 1 Day Prior | ECP | 8-2 | Running the Final OSR Tool | D | R | 60 | |
| 1 Day Prior | ECP | 8-3 | Executing the Final Run of the 1XRNC OSR Tool | D | R | 30 | |
| 1 Day Prior | ECP | 8-4 | Backing Up the 1XRNC Database | D | R | 30 | |
| 1 Day Prior | ECP | 8-5 | Copying the Archived 1XRNC Database That Was Gererated by the RNC OSR Toll from the OMP to the OAM Proxy AP's | D | R | 10 | |
| 1 Day Prior | ECP | 8-6 | Verifying that the MHD's Are Ready for Retrofit-Checking RST and DID settings | D | TO | 10 | |
| 1 Day Prior | ECP | 8-6 | Verifying that the MHD's Are Ready for Retrofit-Performing MHD Compares | N | R | 180 | Y |
| 1 Day Prior | ECP | 7-3 | Backing Up the OMP File System | D/N | L | 120 | Y |
| | | | | | | 930 | 15.5 |
| | | | **Morning Before Night of the Retrofit (BNoR)** | | | | |
| Morning BNoR | ECP | Prep | Open all necessary windows and capture sessions | D/N | R | 10 | |
| Morning BNoR | ECP | na | Checking to ensure no RCV updates have been made since the Final OSR | D | R | 5 | |
| Morning BNoR | ECP | na | Re Run the OSR tool if RCV changes have been found. | D | R | 60 | |
| Morning BNoR | ECP | 9-1 | Identifying and Terminating ECP Background Processes | D | R | 5 | |
| Morning BNoR | ECP | 9-2 | Setting up the ECP for retrofit software loading and data evolution. | D | R | 5 | |
| Morning BNoR | ECP | 9-3 | Reading the RT0 Generic Tape | D | TO | 45 | |

FIG. 3C.

ECP HARDWARE FREEZE

ECP DATABASE FREEZE

| | | | | | | | |
|---|---|---|---|---|---|---|---|
| Morning BNoR | ECP | 9-4 | Reading the ECD Generic Tape | D | TO | 1 | |
| Morning BNoR | ECP | 9-5 | Reading the RT1 Generic Tape | D | TO | 6 | |
| Morning BNoR | ECP | 9-6 | Reading the RT2 Generic Tape | D | TO | 48 | |
| Morning BNoR | ECP | 9-7 | Reading the RT3 Generic Tape | D | TO | 10 | |
| Morning BNoR | ECP | 9-8 | Waiting for All ECP Generic Tapes to Complete Processing | D | R | 180 | |
| Morning BNoR | ECP | 9-9 | Reading the ODD Data | D | R | 5 | |
| Morning BNoR | ECP | 9-10 | Evolving the Online Subscriber Databases | D | R | 20 | |
| Morning BNoR | ECP | 9-11 | Executing the SUPR | D | R | 10 | |
| | | | | | | 410 | **6.833** |
| | | | **Night of ECP Retrofit** | | | | |
| Night of ECP Retrofit | ECP | Prep | Open all necessary windows and capture sessions | D/N | R | 10 | |
| Night of ECP Retrofit | ECP | na | Validate SS7 Market Configuration | N | R | 5 | |
| Night of ECP Retrofit | ECP | na | Execute EVDO Call Processing Tool Check | N | R | 5 | |
| Night of ECP Retrofit | ECP | na | OSR Tool Check | N | R | 2 | |
| Night of ECP Retrofit | ECP | na | Validate ROP logging | N | R | 5 | |
| Night of ECP Retrofit | ECP | na | Validate UPD GEN PROCEED Completed | N | R | 1 | |
| Night of ECP Retrofit | ECP | na | Download /etc/magic script from NTAC LED | N | R | 2 | |
| Night of ECP Retrofit | ECP | 10-1 | Identifying and Terminating ECP Background Processes | N | R | 5 | Y |
| Night of ECP Retrofit | ECP | 10-2 | Collecting the AMA Data | N | L | 30 | Y |
| Night of ECP Retrofit | ECP | 10-3 | Preparing the CDN3's for Prepump | N | R | 2 | Y |
| Night of ECP Retrofit | ECP | 10-4 | Preparing Group 1 of the CDN4's for Activation of Release 27 | N | R | 5 | Y |
| Night of ECP Retrofit | ECP | 10-5 | Executing the Final Evolution of the Online Subscriber Databases | N | R | 15 | Y |
| Night of ECP Retrofit | ECP | 10-6 | Preparing the FMM-AP DBMS Application for retrofit to R27 | N | R | 12 | Y |
| Night of ECP Retrofit | ECP | 10-7 | Prepumping the CDN3's | N | R | 20 | Y |
| Night of ECP Retrofit | ECP | 10-8 | Activating the Flexent AP relese 27 Application Software via SUA | N | R | 26 | Y |
| Night of ECP Retrofit | ECP | 10-9 | Activating the FMM-AP Release 27 Software Packake on Group 1 of the FMM/1xRNC APs | N | R | 20 | Y |
| Night of ECP Retrofit | ECP | 10-10 | Synchronizing the File Systems and flushing cache of old files. | N | R | 5 | Y |
| Night of ECP Retrofit | ECP | 10-11 | Setting the ECP Application Parameters for the Flexent AP's and FMM-AP's | N | R | 5 | Y |
| Night of ECP Retrofit | ECP | 10-12 | Performing the Full Boot f the ECP, Flexent AP's and FMM-AP's to R27 | N | R | 40 | Y |
| Night of ECP Retrofit | ECP | 10-13 | Verifying the Retrofit to R27 and Running the Acceptance Test Plan(Basic Functions CTTP) | N | TO | 30 | Y |
| Night of ECP Retrofit | ECP | 10-14 | Activating the FMM-AP Release 27 Software Packake on Group 2 of the FMM/1xRNC-AP's | N | R | 20 | Y |
| Night of ECP Retrofit | ECP | 10-15 | Performing the ECP Post-Boot Activities | N | R | 10 | Y |
| Night of ECP Retrofit | ECP | 10-15A | Performing the Flexent AP and FMM/1xRNC -AP Post Boot Activities | N | R | 5 | Y |
| Night of ECP Retrofit | ECP | 10-16 | Removing the OMP Application Software of the Previous Release | N | L | 7 | Y |
| Night of ECP Retrofit | ECP | 10-17 | Installing the OMP R27 Supplemental Software | N | R | 5 | Y |
| Night of ECP Retrofit | ECP | 10-18 | Installing the OMP R27 Application Software | N | R | 14 | Y |
| Night of ECP Retrofit | ECP | 10-19 | Clearing the 1xRNC-AP TPUGUI Cache | N | R/L | 5 | Y |
| Night of ECP Retrofit | ECP | 10-20 | Backing Up the Release 27 Databases | N | R | 10 | Y |
| Night of ECP Retrofit | ECP | 10-21 | Ensuring post-retrfofit access to AMA data. | | | | |
| Night of ECP Retrofit | ECP | 10-22 | Provisioning the CALEA Feature and Populating the laesdb Database | CALEA | CALEA | 0 | Y |
| Night of ECP Retrofit | ECP | Post Check | Post Upgrade Cleanup (validating and restarting cron) | N | R | 10 | |
| Night of ECP Retrofit | ECP | 10-23 | Running the Acceptance Test Plan | N | L | 480 | |
| Night of ECP Retrofit | ECP | na | Complete initial Billing tab and email back to Revenue Tesing immediaty so ECP COMMIT can be performed. Email completed CTTP to NetworkImplementationCTTDevelopment. | N | L | 1 | |
| Night of ECP Retrofit | ECP | 9-1 | Perform a Full OMP backup | D/N | L | 180 | Y |
| | | | | | | 992 | **16.53** |
| | | | **1 Day After Night of ECP Retrofit (Commit)** | | | | |
| 1 Day After ECP Retr | ECP | Prep | Open all necessary windows and capture sessions | D/N | R | 10 | |
| 1 Day After ECP Retr | ECP, EVDO, 5E, 1x | na | Validate All Service Measurement Feeds are operational | D | R | 10 | |

EVDO RNC/AP INTEGRATION HARDWARE FREEZE

EVDO DATABASE/PROVISIONING FREEZE

FIG. 3D.

ECP HARDWARE FREEZE

ECP DATABASE FREEZE

EVDO RNC/AP INTEGRATION HARDWARE FREEZE

EVDO DATABASE/PROVISIONING FREEZE

| | | | | | | | |
|---|---|---|---|---|---|---|---|
| 1 Day After ECP Retr | ECP | 13-1 | Committing the ECP on Generic Release 27.0 | N | R | 120 | Y |
| 1 Day After ECP Retr | ECP | 12-1 | Determining the Current GIU to Install | N | R | 20 | Y |
| 1 Day After ECP Retr | ECP | 12-2 | Installing GIU_29 on the Flexent AP's via(GNP-AP's) SUA | N | R | 60 | Y |
| 1 Day After ECP Retr | ECP | 12-2 | Installing GIU_29 the GIU on the Flexent AP's via LMT(if sites are not cabled back to the code | N | L | 120 | Y |
| 1 Day After ECP Retr | ECP | 13-2 | Commiting the Flexent AP Release 27.0 Flexent AP Release 27.0 Generic via SUA | N | R | 15 | Y |
| 1 Day After ECP Retr | ECP | 13-3 | Commiting the FMM-AP Release 27.0 Application Software via SUA | N | R | 15 | Y |
| 1 Day After ECP Retr | ECP | 13-4 | Removing the ECP/1xRNC OSR Package on the OMP | N | R | 3 | Y |
| 1 Day After ECP Retr | ECP | Post Check | Verifying the FMM-AP Intraframe and Interframe Cabling (aplanconfig) | N | R | 30 | |
| 1 Day After ECP Retr | ECP | 13-5 | Verifying the OMP is booted off of disk 0 | N | R | 1 | Y |
| 1 Day After ECP Retr | ECP | 13-6 | Installing the Solaris operating system patches on the OMP | N | L | 180 | Y |
| 1 Day After ECP Retr | ECP | 7-1 | Backing Up the INCORE ECD Databases | N | L | 2 | Y |
| 1 Day After ECP Retr | ECP | 7-2 | Performing an ECP Full System Backup | N | L | 300 | Y |
| | | | | | | 886 | 14.77 |
| | | | | | | | |
| | | | **Night of EVDO Retrofit** | | | | |
| Night of EVDO Retrof | EVDO | Prep | Open all necessary windows and capture sessions | D/N | R | 10 | |
| Night of EVDO Retrof | EVDO | Prep | Acquainting yourself with the DO-RNC market configuration | N | R | 5 | |
| Night of EVDO Retrof | EVDO | 4-2 | Check Alarms | N | R | 5 | |
| Night of EVDO Retrof | EVDO | Prep | Conduct Pre Retrofit Prechecks | N | R | 10 | |
| Night of EVDO Retrof | EVDO | 3-17 | ReRun the OSR Tool | N | R | 20 | |
| Night of EVDO Retrof | EVDO | 4-3 | Activate that software via SUAGUI | N | R | 120 | Y |
| Night of EVDO Retrof | EVDO | 4-3 | Activate Sub Sec- Odd DO-AP's offlined and updated. | N | R | na | Y |
| Night of EVDO Retrof | EVDO | 4-3 | Activate Sub Sec- Odd DO-AP's onlined | N | R | na | Y |
| Night of EVDO Retrof | EVDO | na | Initiate EVDO test call to validate functionality | N | L | 5 | Y |
| Night of EVDO Retrof | EVDO | 4-3 | Activate Sub Sec- Even DO-AP's offlined and updated | N | R | na | Y |
| Night of EVDO Retrof | EVDO | 4-3 | Activate Sub Sec- Even DO-AP's onlined | N | R | na | Y |
| Night of EVDO Retrof | EVDO | 4-3 | Activate Sub Sec- Run switchback and balance loads | N | R | na | Y |
| Night of EVDO Retrof | EVDO | na | Initiate full CTTP for DO-RNC | N | L | 20 | Y |
| Night of EVDO Retrof | EVDO | Post Check | Verifying the retrofit | N | L/R | 40 | Y |
| Night of EVDO Retrof | EVDO | 4-12 | Change the MOTD | N | R | 20 | Y |
| Night of EVDO Retrof | EVDO | 4-13 | Synchronize collection of configuration data used by Vallent Prospect | N | R | 30 | Y |
| | | | | | | 285 | 4.75 |
| | | | | | | | |
| | | | **1 Day After Night of EVDO Retrofit** | | | | |
| 1 Day After EVDO Re | EVDO | Prep | Open all necessary windows and capture sessions | D | R | 10 | |
| 1 Day After EVDO Re | EVDO | Prep | Validate all software is up to date prior to commiting | D | R | 5 | |
| 1 Day After EVDO Re | EVDO | 6-2 | Commit the current software via SUAGUI | D | R | 5 | Y |
| | | | | | | 20 | 0.333 |

FIG. 3E.

PARALLEL LOADING OF WIRELESS SWITCH UPDATES

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present invention relates to updating software on wireless telephone switches. More particularly, the present invention relates to systems and methods that improve the efficiency of updating the software on wireless switches by loading updates to different components of the switch in parallel.

BACKGROUND OF THE INVENTION

Wireless switches are used to provide wireless voice and data services to wireless telephone and data customers. One wireless switch may connect to a large number of wireless antennas towers that communicate with customers' wireless devices. A wireless switch performs several important functions. First, the wireless switch manages hand-offs of a particular wireless device from one antenna tower to another. Second, the wireless switch routes calls to and from the traditional telephone network. Third, the wireless switch manages wireless data access for services such as email and Internet access. Each of these components has previously been updated individually, making applying updates a time consuming serial process.

SUMMARY OF THE INVENTION

The present invention generally relates to updating at least some of the software components on a wireless switch substantially in parallel, thereby reducing the time and resources necessary to perform an update and reducing the negative impacts of updates on a wireless network.

BRIEF DESCRIPTION OF THE SEVERAL VIEWS OF THE DRAWINGS

The present invention is described in detail below with reference to the attached drawing figures, wherein:

FIGS. 3A through 3E illustrate a parallel loading protocol for a wireless switch update.

DETAILED DESCRIPTION OF THE INVENTION

Figure 1:
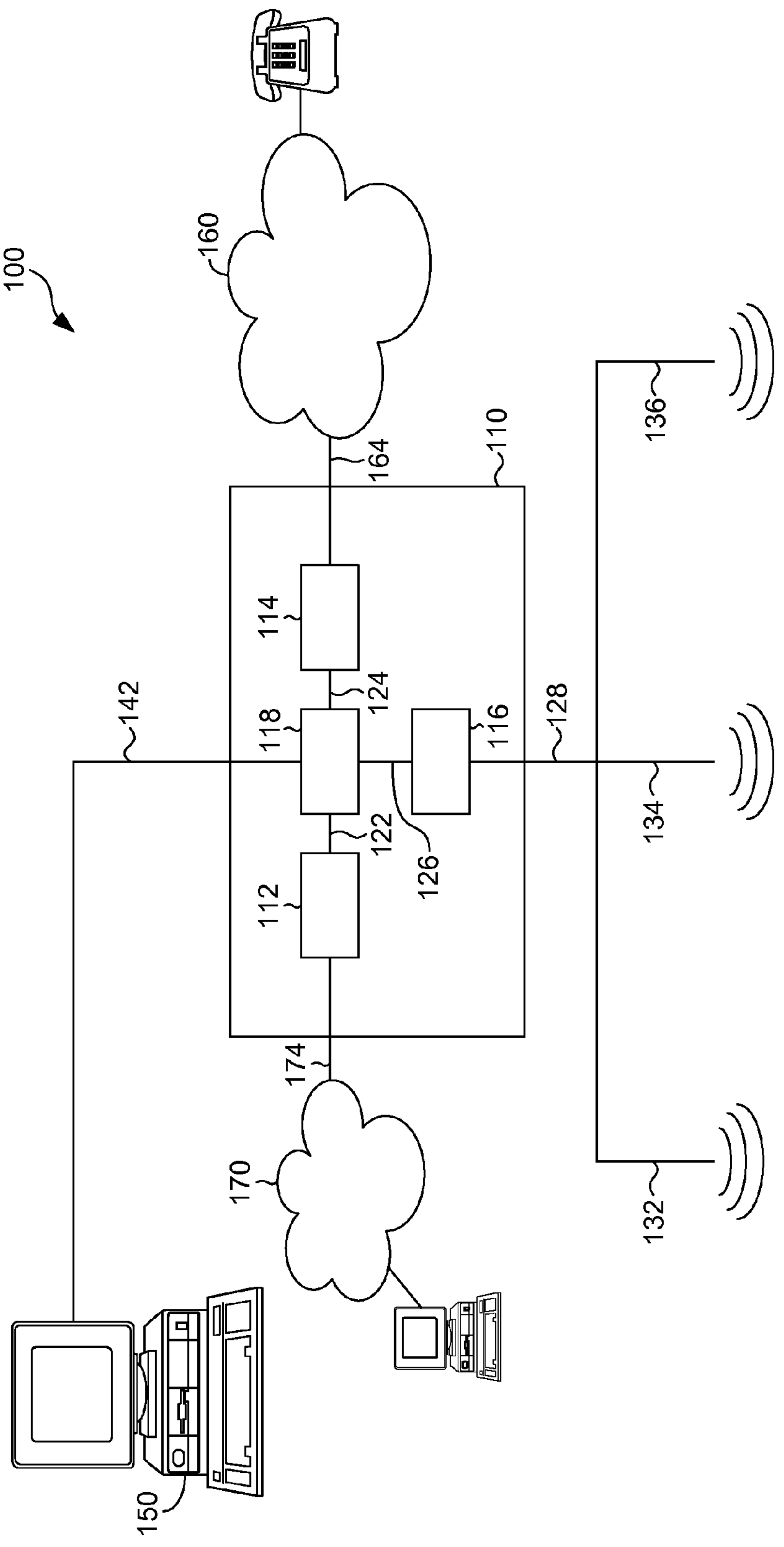
FIG. 1 is a block diagram of a wireless switch environment suitable for use in implementing the present invention.

The present invention provides systems and methods for use in updating software on wireless switches. The mobile telephone networks that most Americans have become accustomed to typically use a large number of antenna towers connected to mobile switches. The antenna towers exchange radio signals with mobile telephones, and the antenna towers transmit received signals to the mobile switch, while the mobile switch transmits signals to be delivered to the mobile telephone to the appropriate antenna tower for radio broadcast. A single mobile switch may interface with a large number, even hundreds or more, antenna towers.

Mobile switches control a number of important aspects of mobile telephony and data services. For example, a mobile switch manages the hand off of a mobile phone session from one antenna tower to the next antenna tower when the mobile phone is moving.

The mobile switch also manages call routing for calls to and from mobile phones in communication with the antenna towers it controls. For example, when a mobile phone user dials a telephone number and seeks to connect a call, the mobile switch analyzes the dialed numbers to determine how to route the call. This routing functionality requires that the mobile switch interface with the traditional land line telephone network, or PSTN, and route calls appropriately to the PSTN. Additionally, the mobile switch must be able to identify calls that should be routed to other mobile phone users on its network.

With the rapid increase in mobile data networking, mobile switches have increasingly also provided mobile data services, such as email and Internet access, to both mobile telephone users with the appropriately enabled telephones, and to customers with wireless data cards for use in their computers.

These three types of wireless switch functionalities are typically managed by three distinct software components on the wireless switch. Often, a further software component manages these three components and provides access to network technicians who may remotely access the mobile switch for repairs or updating. A variety of commercial vendors sell mobile switches for use by mobile telephone service providers. For example, Lucent™ sells switches used by a variety of mobile telephone providers, as do other switch manufacturers.

The software components on switches require frequent updating to provide additional functionality and to accommodate network changes. Due to the inherent complexity of a mobile switch, applying an update to a switch is a long process requiring substantial preparation to assure that the update will function properly and includes all necessary aspects. Mobile switch updates have been prepared and applied substantially serially, leading to any switch update requiring many weeks of work and many software uploads to the switch. This process is problematic because many aspects of the switch and the network must be "frozen" for a time before the update so that the update can be applied properly. During this freeze, routine maintenance and bug fixes cannot be performed without jettisoning the anticipated update. Further, during the actual application of an update a mobile switch will be out of service for a period of time, rendering mobile telephone and data service unavailable to customers serviced by that mobile switch. For these and other reasons, systems and methods that streamline the software update process for mobile switches are desirable.

Referring now to FIG. 1, a system 100 for mobile telephony and data services is illustrated. A mobile switch 110 communications with a first antenna 132, a second antenna 134, and a third antenna 136 over a connection 128. One skilled in the art will appreciate that in practice a single mobile switch 110 will likely communicate with far more antenna towers 132, 134, 136 than the three illustrated in FIG. 1. One skilled in the art will further realize that connection 128 to the antenna towers 132, 134, 136 may be of any appropriate media, such as a fiber optic cable, and may operate using any appropriate protocol.

Mobile switch 110 includes a wireless network control component 116. Wireless network control component 116 manages wireless sessions between antenna towers 132, 134, 136 and mobile phones (not shown), which may include, for purposes of this description, wireless data computer cards. Wireless network control component 116 may perform some call routing, such as routing calls to other mobile telephone users connected to an antenna tower controlled by mobile switch 110.

Mobile switch 110 further includes a PSTN interface component 114. PSTN interface component 114 connects to the PSTN 160 via a connection 164. One skilled in the art will appreciate that connection 164 may be a variety of trunks or other PSTN media types, and will likewise include appropriate signaling channels to perform call routing through the PSTN 160. PSTN interface component 114 manages the routing and connection of calls to and from mobile telephone users using mobile switch 110 and telephones on the PSTN 160.

Mobile switch 110 further includes a data network access component 112. Data network access component 112 provides access to a data network 170, such as the Internet, over connection 174. One skilled in the art will appreciate that connection 174 may be any type of data connection, such as a high band width fiber optic cable operating under any of a variety of protocols such as TCP/IP. Data network access component manages the data session to and from mobile telephone users using mobile switch 110.

Mobile switch 110 may further include a switch management component 118. Switch management component 118 may permit a remote user 150 to access mobile switch 110 via a remote connection 142. Switch management component 118 may access data network access component 112 via connection 122, may access PSTN interface component 114 via connection 124, and may access wireless network component 116 via connection 126. One skilled in the art will appreciate that connections 122, 124, 126 may be logical rather than physical and merely represent switch management component's 118 ability to access the other component of mobile switch 110, such as may be necessary to apply a software update the various components of mobile switch 110 from a remote location 150.

One skilled in the art will appreciate that mobile switch 110 could be provided by any vendor, and that the assorted components of mobile switch 110 may take on different names for different vendors. For example, mobile switch 110 may be provided by Lucent, in which case wireless network control component 116 may comprise an Executive Cellular Processor, data network access component 112 may comprise an Evolution Data Only Radio Network Controller, and PSTN interface component 114 may comprise a SESS.

To provide a software update to mobile switch 110 may require that each individual component of mobile switch 110 be updated. In accordance with the present invention, rather than updating each individual component of mobile switch 110 in a serial fashion, updates may be performed in a substantially parallel fashion, particularly updates to wireless network control component 116 and data network access component 112.

One skilled in the art will appreciate that the content of a software update to mobile switch 110 will vary from update to update. Each update will include modifications to be made to one or more component of mobile switch 110. Any update to any component of mobile switch 110 requires substantial preparation to insure that the update complies with network requirements and configurations. Once an update is ready to be applied to a component of mobile switch 110, it is often tested prior to loading. Once an update is ready to load to mobile switch 110, an engineer may load the update from remote location 150 over remote connection 142 to switch management component 118. An engineer at remote location 150 may then use switch management component 118 to load the update to the appropriate component of mobile switch 110.

In accordance with the present invention, the preparation of updates for loading, as well as the loading of updates, to different components of mobile switch 110 may be performed in a parallel fashion.

Figure 2:
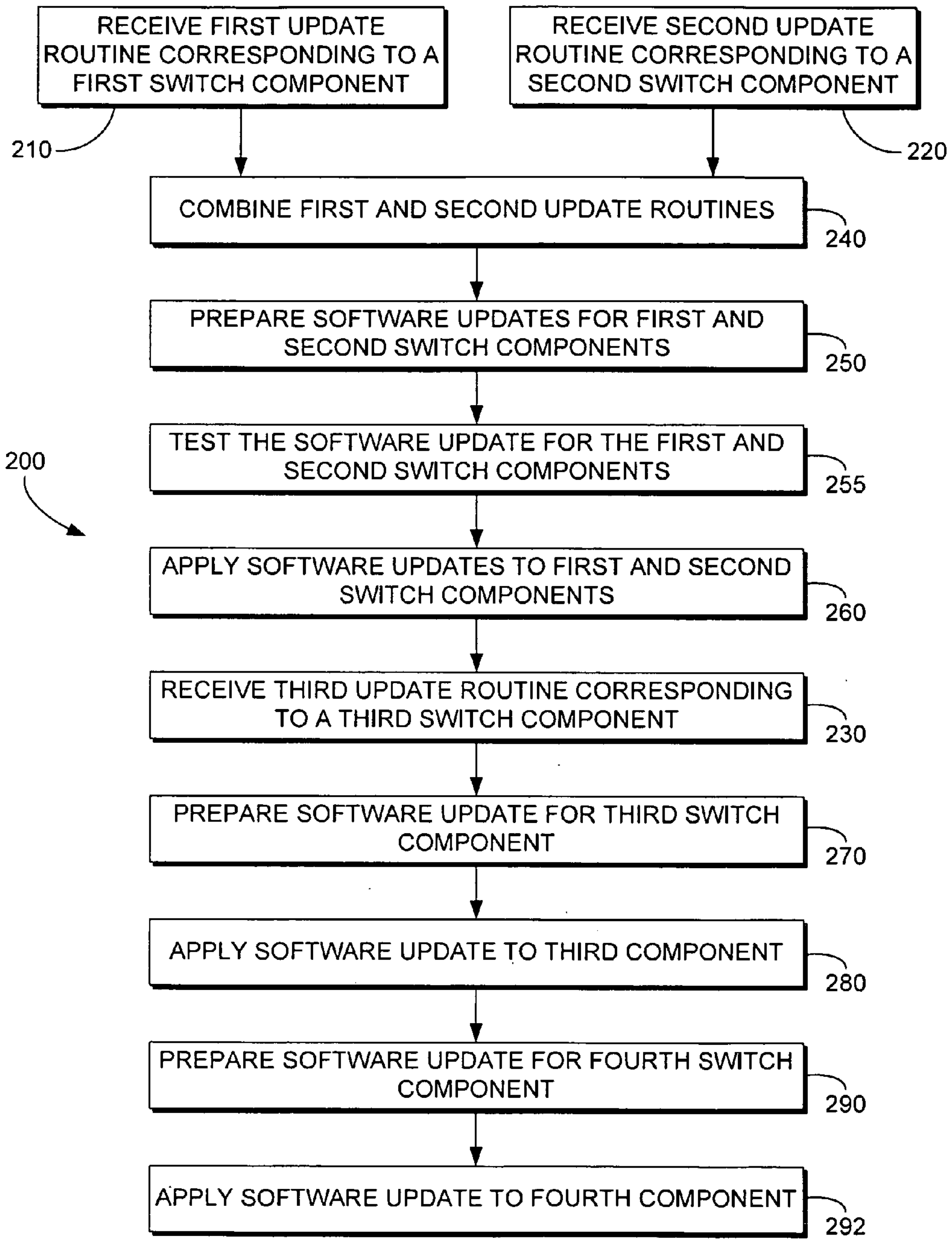
FIG. 2 illustrates a method in accordance with the present invention for upgrading wireless switch components in parallel.

A method 200 in accordance with the present invention is illustrated in FIG. 2. In step 210, a first update routine corresponding to a first switch component, such as the wireless network control component, may be received. In step 220 a second update routine corresponding to a second switch component, such as the data network access component, may be received. In step 230, a third update routine corresponding to a third switch component, such as the PSTN interface component, may be received. Steps 210, 220, 230 may comprise receiving software update preparation procedures from the vendor of the mobile switch. In step 240 the first and second update routines are combined. For example, as demonstrated in FIG. 3, compatible routines may be combined such that they are performed concurrently. Step 240 may involve, for example, combining the preparation routines for updating a wireless network control component and a data network access component into a single preparation routine. In step 250 a software update for the first and second switch components are prepared. As a result of combining compatible preparation routines of the first and second components to perform a parallel updating, a user need not go through the serial steps of receiving a software update preparation procedure, preparing the software update, testing the software update, and applying the software update for one component, then repeating the process of receiving the procedure, preparing the update, testing the update, and applying the update for the second component. Thus, the updates to the first and second component may be applied within an abbreviated period of time when loaded in parallel relative to the extended time interval required for a serial update of the first and second component. As described below regarding FIG. 3, parallel loading of switches in accordance with the present invention potentially decreases the amount of time required to complete the updates by half, a considerable achievement and gain for efficiently updating wireless switch components. Once an update is ready to be applied to a component, that update is often tested prior to loading 255. In step 260 the software updates for the first and second switch components may be applied to the switch. An exemplary form of this process will be described in later paragraphs pertaining to FIGS. 3A to 3E. One skilled in the art will recall that this may happen from a remote location over a remote connection through a switch management component. In step 270 a software update may be prepared for the third switch component. In step 280 a software update may be applied to the third switch component. One skilled in the art will appreciate that step 280 may occur locally (for example, by exchanging media such as magnetic tapes) or may occur remotely. One skilled in the art will further understand that method 200 may further include steps of preparing 290 and applying 292 a software update to a switch management component and that step 292 of applying a software update to a switch management component may occur before, after, or during the application of updates to the other mobile switch components. One skilled in the art will further appreciate that step 292 of applying an update to the switch management component may be divided into more than one partial updates that likewise may be applied at various time during method 200.

Method 200 provides the potential to save considerable time in preparing and applying software updates by combining at least the preparation of the first and second software updates. Depending upon the nature of the update and the mobile switch being updated, step 260 of applying software updates to the first and second switch components may update both components simultaneously or may update each component individually spaced apart somewhat in time.

Referring now to FIGS. 3A through 3E, an exemplary protocol 300 for applying a parallel wireless switch upgrade to a Lucent™ switch is illustrated. This exemplary protocol demonstrates the simultaneous updating of two wireless switch components: protocol 300 outlines an exemplary update process to permit the parallel updating of both the ECP™ and EVDO™ components of the switch. One skilled in the art will appreciate that update protocols for other types of switches may be combined in a similar fashion. Protocol 300 comprises a number of update tasks that are part of an update to the ECP™ and the EVDO™ of a wireless switch combined into a single parallel update process. To update the ECP™ and EVDO™ components in a serial update process, first all update tasks would need to be completed for the ECP component, and then the ECP would be updated. This process requires approximately three weeks to prepare the update tasks, freeze the hardware, freeze the data base, and complete the retro fit. After the ECP update is completed, then an approximately three week long period for the EVDO update would commence. In all, over about six weeks of interrupted service from the two components would be required to complete the serial update, and an interval of approximately three weeks necessarily separates the retrofit of the first component and the second component if a serial update is performed. As demonstrated in the exemplary parallel update protocol 300, by combining compatible update tasks for each component, the update period may be reduced to three weeks and one day for both components. It should be noted that the actual ECP and EVDO retrofit occurs on two separate days; however, these retrofit periods occur concurrently without the three week delay required to load a new set of update tasks. As such, the wireless switch updates of the first and second components, i.e. the ECP and EVDO components, can be said to occur roughly at the same time. Column 310 indicates periods during which an ECP™ freeze must occur, while column 312 indicates periods where an EVDO™ freeze must occur. Column 320 indicates the timeline of a given process relative to the scheduled switch update. Column 330 indicates which element or elements are affected by a given task. Column 340 describes the procedure implemented for a particular task. Column 350 indicates tasks to be performed. Column 360, column 370, column 380, and column 390 provide additional information relating to update tasks that will be familiar to one of ordinary skill in the art. As can be seen in FIGS. 3A through 3E, protocol 300 combines update tasks for an ECP™ component and an EVDO™ component so as to permit the parallel updating of these two components of a single wireless switch. For example, in FIG. 3C during the "2 Days Prior" heading, 16 EVDO tasks are combined with 12 ECP tasks and completed during the "2 Days Prior" timeline. If the EVDO and ECP retrofits were handled separately, these two sets of tasks would be conducted approximately three weeks apart, rather than concurrently as in accordance with the present invention.

One skilled in the art will appreciate that the present invention may be applied to any type of mobile switch that now exists or that may be developed for purposes of streamlining the updating of software upon that switch. One skilled in the art will appreciate that the types of computing hardware and the corresponding software embodied in a given switch may vary without departing from the scope of the present invention. One skilled in the art will further appreciate that the types of wireless networks that may be used are not limited to any particular standard or protocol. Likewise, one skilled in the art will appreciate that the various physical media described herein for transmitting signals between different components for networks may be varied without departing from the scope of the present invention.

The invention claimed is:

1. A method for updating a multi-component mobile wireless switch for a mobile telephone network, the method comprising:

receiving a first update routine having a first freeze period for a first component of the mobile wireless switch from a vendor of the mobile wireless switch, wherein the first component comprises a wireless network control component;

receiving a second update routine having a second freeze period for a second component of the mobile wireless switch from the vendor of the mobile wireless switch, wherein the second component comprises a mobile data network access component;

combining the first update routine for the first component of the mobile wireless switch and the second update routine for the second component of the mobile wireless switch into a single preparation routine including at least overlapping the first freeze period and the second freeze period, wherein the single preparation routine is a software update for the first component and the second component of the mobile wireless switch in parallel;

preparing the software update for the first component of the mobile wireless switch and second component of the mobile wireless switch in parallel;

testing the software update for the first component of the mobile wireless switch and second component of the mobile wireless switch in parallel;

applying the software update for the first component of the mobile wireless switch and second component of the mobile wireless switch in parallel; and updating a third component of the mobile wireless switch after the first component and the second component of the mobile wireless switch are updated, wherein the third component comprises a PSTN interface component and wherein the updates to the first component and the second components are applied from a remote location through a fourth component of the multi-component mobile wireless switch, wherein the fourth component comprises a mobile switch management component.

2. The method of claim 1, further comprising:

updating the fourth component, wherein the update to the fourth component is applied from a remote location.

3. The method of claim 2, wherein updating the fourth component occurs after updating the first component and after updating the second component at roughly the same time the first component of the same mobile wireless switch is updated.

4. The method of claim 2, wherein updating the fourth component occurs before updating the first component and before updating the second component at roughly the same time the first component of the same mobile wireless switch is updated.

5. The method of claim 2, wherein updating the fourth component occurs in part before and in part after updating the first component and in part before and in part after updating the second component at roughly the same time the first component of the same mobile wireless switch is updated.

6. The method of claim 2, wherein the update to the third component is applied from a remote location through the fourth component.

7. The method of claim 2, wherein the update to the third component is applied locally.

8. A method for loading a multi-component update onto a remotely located mobile wireless switch of a mobile telephone network, the method comprising:

providing a remotely located mobile wireless switch, comprising:

a first component comprising a wireless network control component;

a second component comprising a mobile data network access component; and a third component comprising a PSTN interface component; and a fourth component comprising a mobile switch management component;

receiving, from a vendor of the remotely located mobile wireless switch, a first update routine for the first component of the remotely located mobile wireless switch, the first update routine including a first freeze period;

receiving, from the vendor of the remotely located mobile wireless switch, a second update routine for the second component of the remotely located mobile wireless switch, the second update routine including a second freeze period;

combining the first update routine for the first component and the second update routine for the second component of the remotely located mobile wireless switch into a single preparation routine including at least overlapping the first freeze period and the second freeze period, wherein the single preparation routine is a software update for the first component and the second component of the mobile wireless switch in parallel;

preparing the software update for the first component and second component of the remotely located mobile wireless switch in parallel;

testing the software update for the first component and second component of the remotely located mobile wireless switch in parallel;

loading a software update from a remote location through a fourth component to both the first component and the second component in parallel; and loading a software update to the third component after loading the software update to the first component and the second component.

9. The method of claim 8, further comprising:

loading a software update to the fourth component from a remote location after updating the first component and the second component in parallel.

10. The method of claim 8, further comprising:

loading a software update to the fourth component from a remote location before updating the first component and the second component in parallel.

11. The method of claim 8, further comprising:

loading a software update to the fourth component from a remote location in part before and in part after updating the first component and second component in parallel.

12. The method of claim 8, wherein, loading a software update to the third component comprises loading a software update from a remote location through the fourth component.

13. The method of claim 8, wherein loading a software update to the third component comprises loading a software update locally.

* * * * *